United States Patent [19]

Jones

[11] Patent Number: 5,417,354
[45] Date of Patent: May 23, 1995

[54] UNIVERSAL CARRIER FOR FULLY RIGGED FISHING POLES

[76] Inventor: James C. Jones, 7 Barbara Dr., Brownsburg, Ind. 46112

[21] Appl. No.: 19,156

[22] Filed: Feb. 17, 1993

[51] Int. Cl.$^6$ ............................................. A45F 3/02
[52] U.S. Cl. ................................... 224/202; 224/205; 224/922; 224/257; 206/215.11
[58] Field of Search ............ 224/922, 913, 916, 917, 224/202, 205, 257, 268, 202, 226, 195; 206/315.11, 579; 43/25, 25.2, 26; 150/154, 160

[56] References Cited

U.S. PATENT DOCUMENTS

| | | | |
|---|---|---|---|
| 873,431 | 12/1907 | Heine | 224/240 |
| 1,092,833 | 4/1914 | Grant . | |
| 2,671,486 | 3/1954 | Shaw | 224/205 |
| 2,723,482 | 11/1955 | Marten | 206/315.11 |
| 2,732,871 | 1/1956 | Drown | 224/205 |
| 3,662,933 | 5/1972 | Michal . | |
| 3,674,190 | 7/1972 | Wright . | |
| 4,389,806 | 6/1983 | Herring | 224/226 |
| 4,523,704 | 6/1985 | Washington . | |
| 4,529,112 | 7/1985 | Miller . | |
| 4,546,877 | 10/1985 | Evans | 224/922 |
| 4,573,610 | 3/1986 | Hurner | 224/918 |
| 4,628,628 | 12/1986 | Burgin et al. . | |
| 4,726,141 | 2/1988 | McBride et al. . | |
| 4,792,073 | 12/1988 | Jacober . | |
| 4,815,509 | 3/1989 | Owen . | |
| 4,953,768 | 9/1990 | Muse | 224/257 |
| 4,966,319 | 10/1990 | Fleming | 224/205 |
| 5,040,324 | 8/1991 | Rivera et al. | 224/922 |
| 5,042,704 | 8/1991 | Izzo | 224/202 |
| 5,104,017 | 4/1992 | Vandagriff | 224/917 |
| 5,269,410 | 12/1993 | Abregano | 206/315.3 |
| 5,277,306 | 1/1994 | Sargent | 43/25.2 |

Primary Examiner—J. Casimer Jacyna
Assistant Examiner—David J. Walczak

[57] ABSTRACT

A compact apparatus for carrying and storing: one or more fully rigged fishing poles, shotguns, hunting rifles, tripods, pairs of skis, or a combination thereof. Comprising three major components: (1) A protective "sleeve" that encases a selected item and that has connectors for attaching the sleeve to a "strap assembly." For encasing fully rigged fishing poles, said sleeve is a cone shaped bag with a drawstring closure and is made from a triangular shaped sheet of pliable material wherein the two elongated edges of the triangle have been seamed together and the base edge of the triangle has been hemmed. A drawstring is placed within the hem and a drawstring locking device is attached to the drawstring thereby providing the capability to control the degree of openness of the sleeves' opening. (2) A dual purpose protective "pouch" that (a) when the sleeve is not in use, and the pouch is attached to the "strap assembly," encases and protects the empty sleeve, and (b), at alternate times, such as when the sleeve is being used to encase a fully rigged fishing pole, the pouch attaches to the fishing pole while it also encases and protects the item of terminal fishing tackle that is attached to the fishing line of the fully rigged fishing pole. Said pouch is a receptacle with access to its' cavity being controlled by a securable flap, and can be either molded or made from a pliable material. And (3), a "strap assembly," such as a common shoulder strap with connectors and intermediate connectors, that provide for: (a) The attachment of one or more sleeves that have their contents and associated pouches contained within. (b) The attachment of one or more pouches that have their associated empty sleeves contained within. Or (c), a combination of the previous two possibilities.

20 Claims, 7 Drawing Sheets

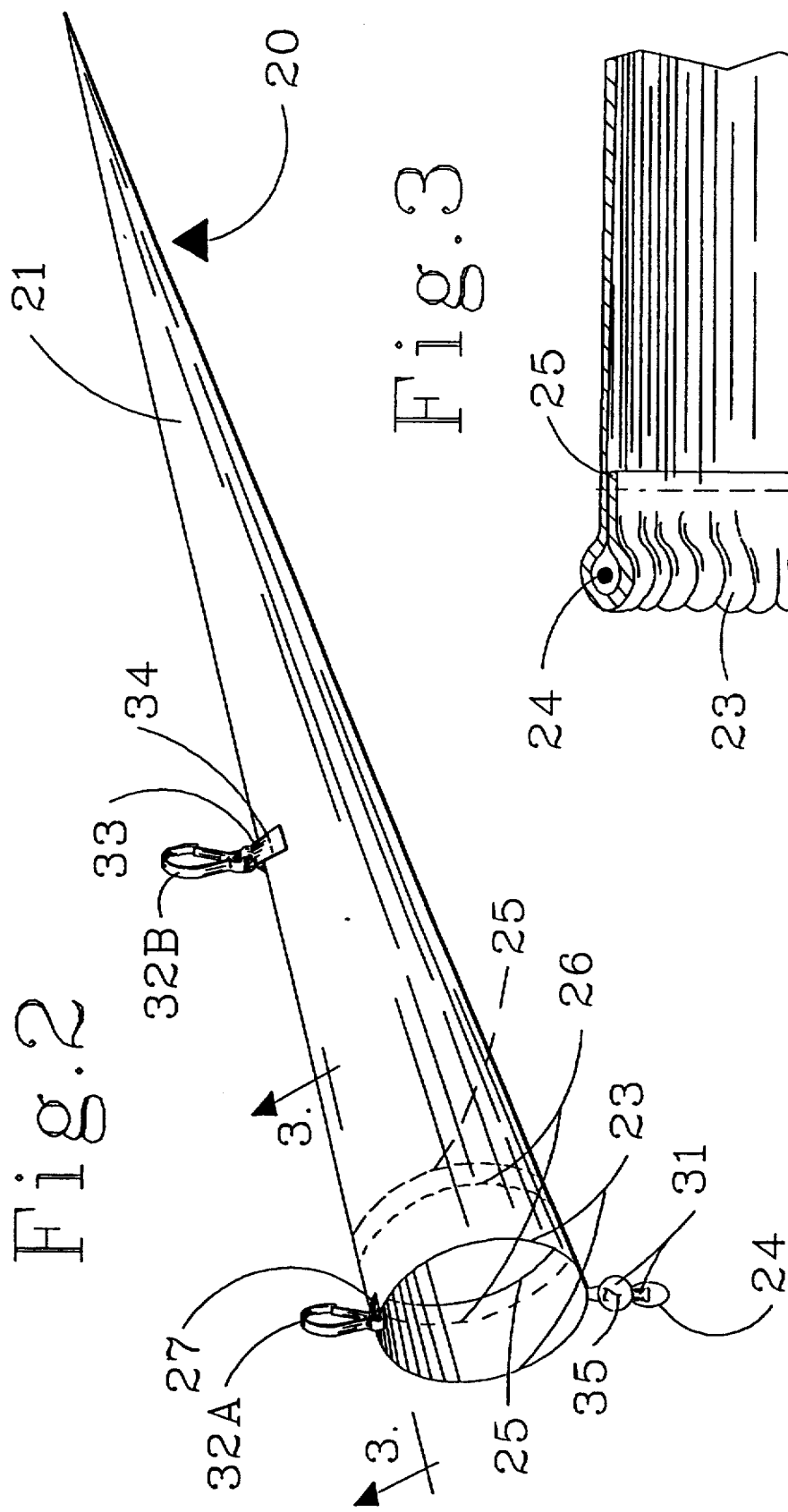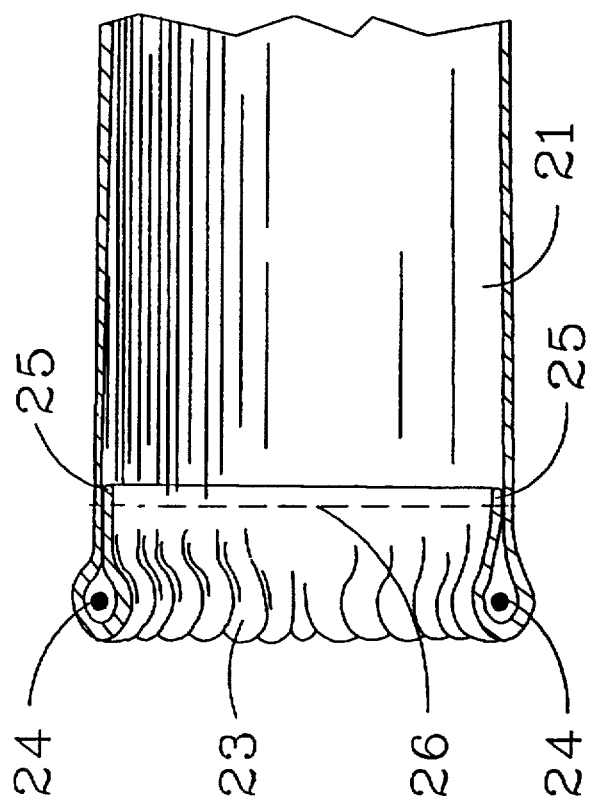

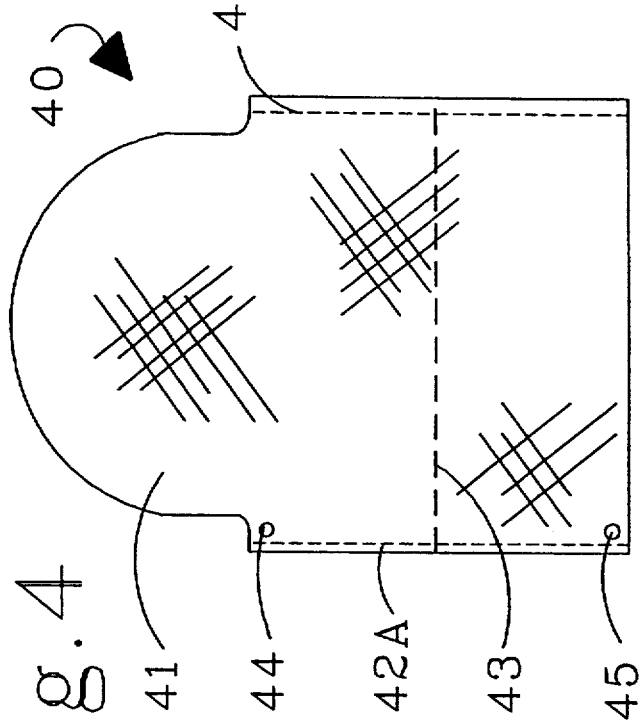
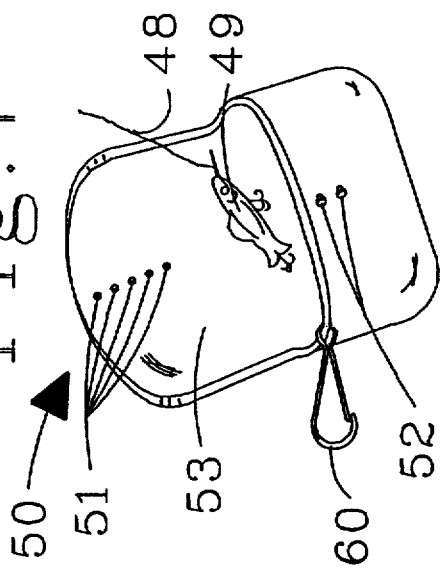
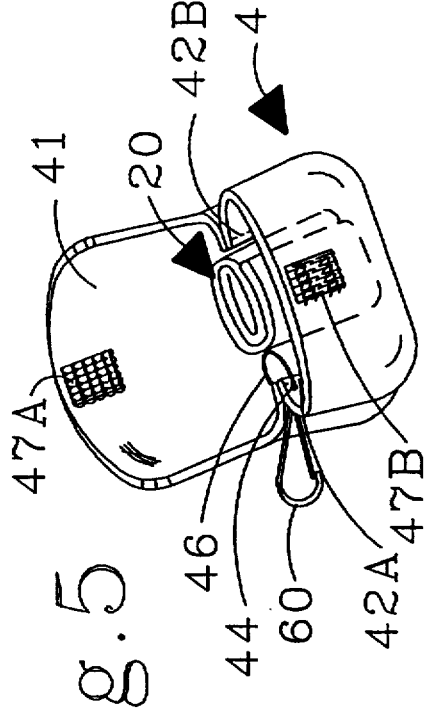

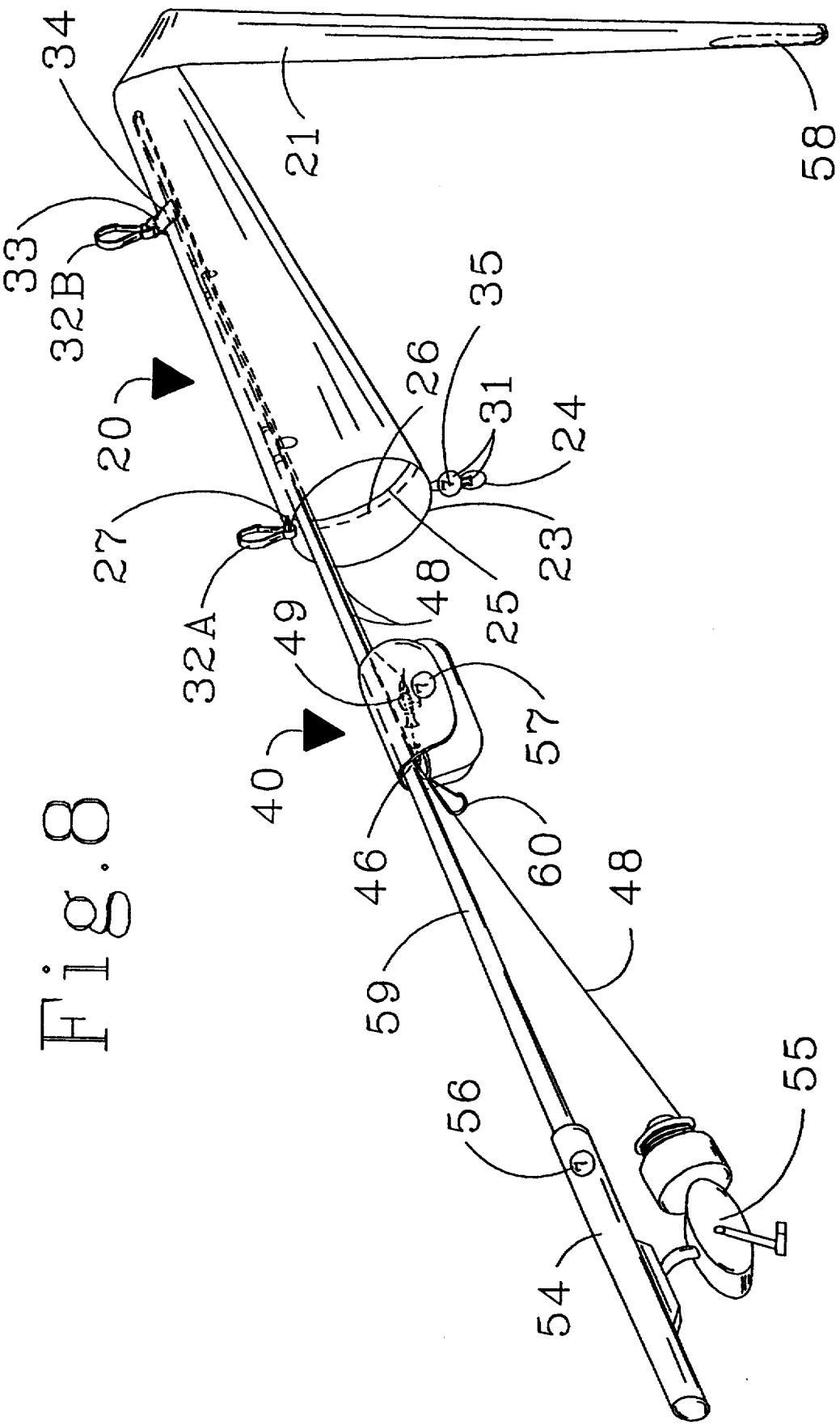

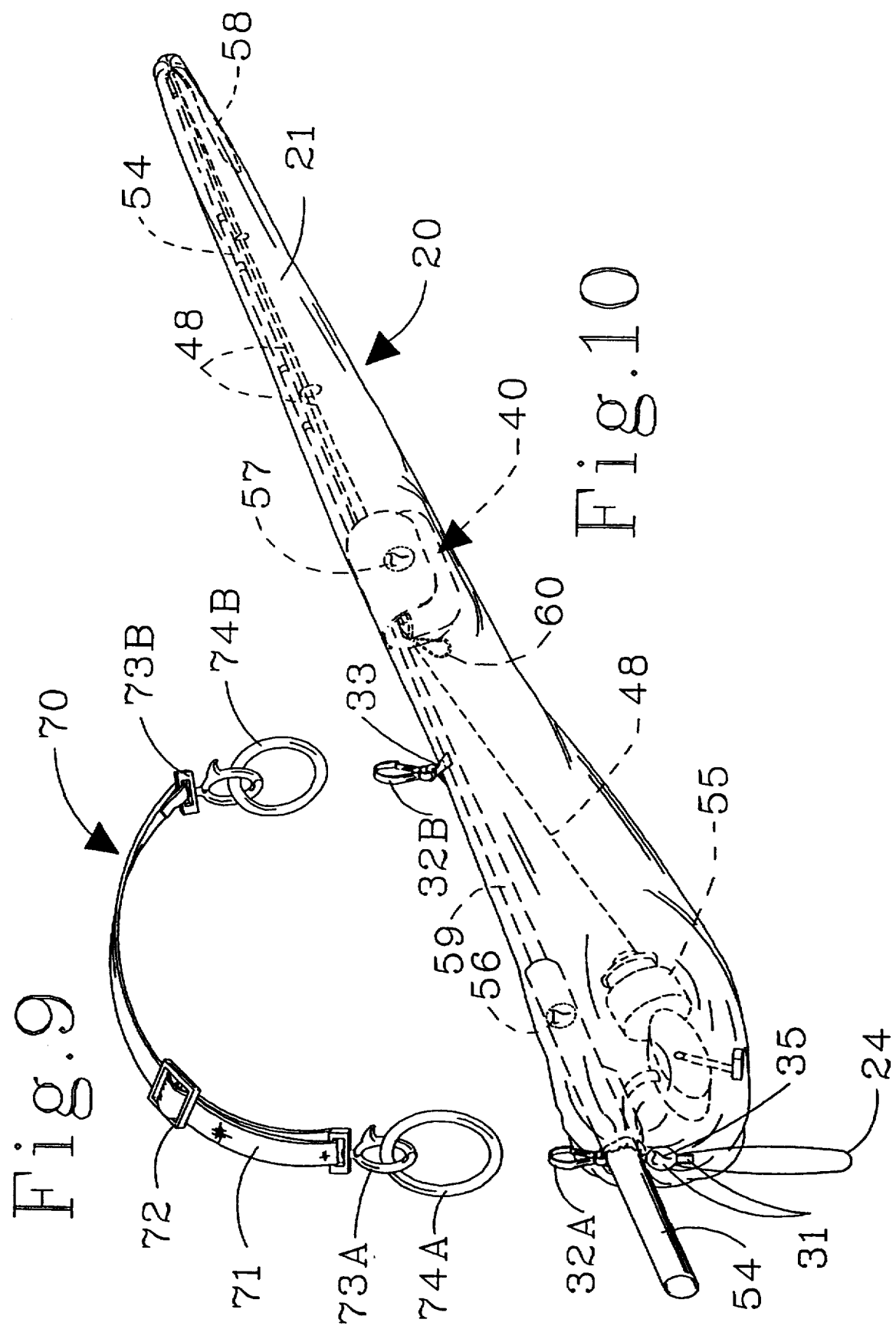

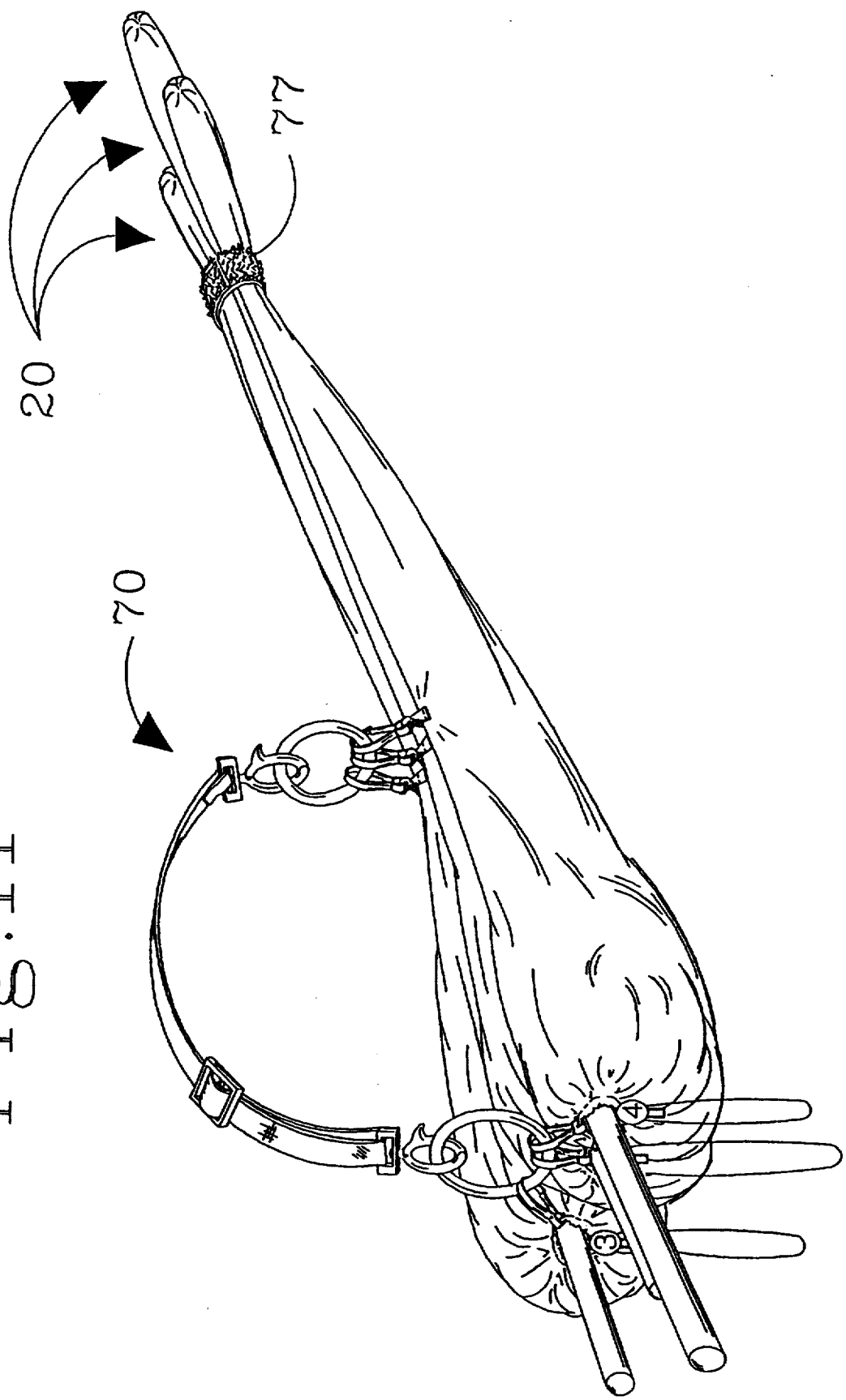

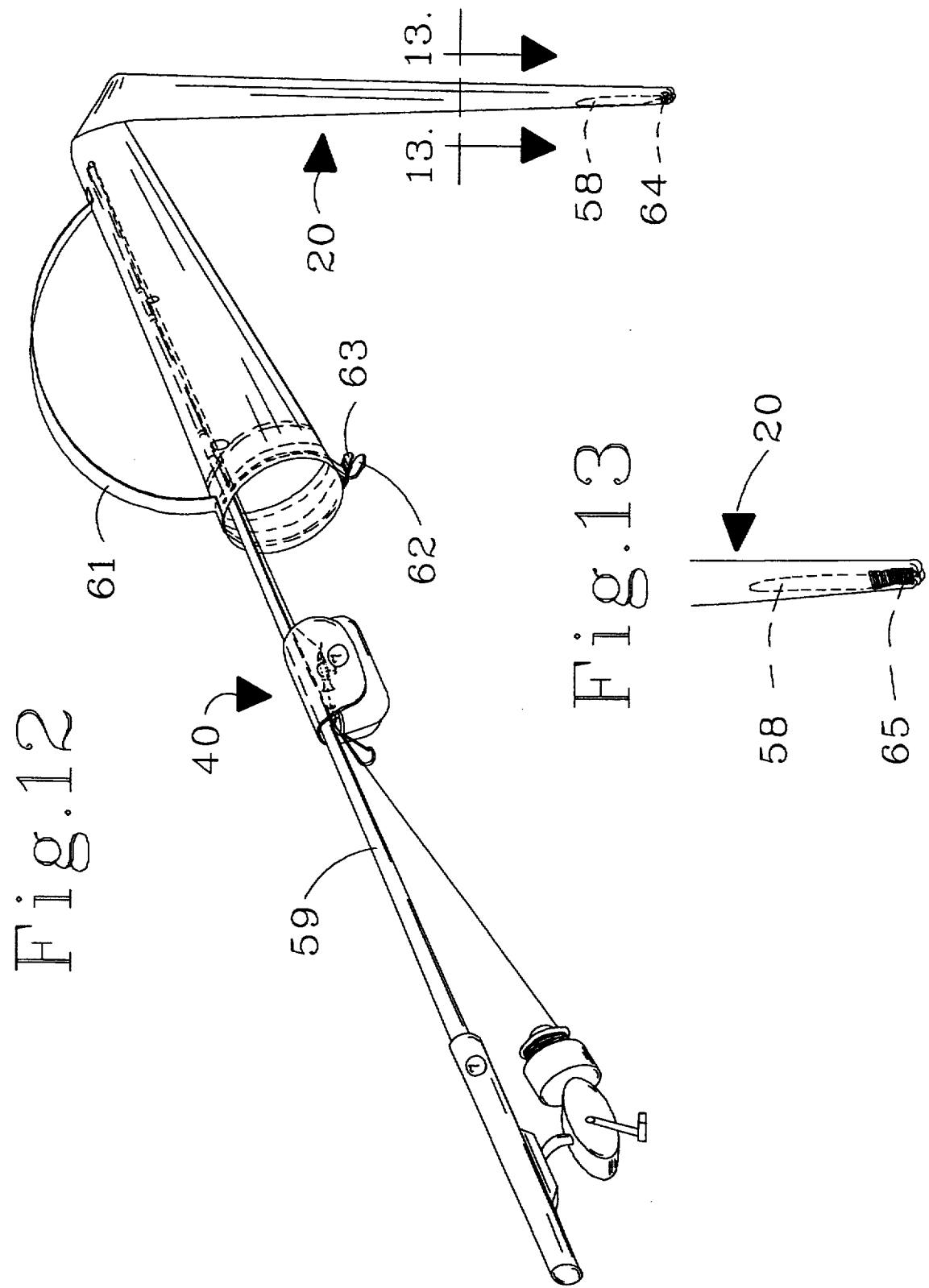

UNIVERSAL CARRIER FOR FULLY RIGGED FISHING POLES

BACKGROUND-FIELD OF INVENTION

This invention relates to carriers that can be used in carrying and storing fishing poles and particularly to an apparatus that easily allows a person to carry and store a plurality of fishing rods, of varying styles and lengths, with their reels, lines, and terminal tackle still attached thereto. This invention also may be adapted for use in carrying and storing other elongated objects, especially hunting rifles and shotguns.

BACKGROUND-DISCUSSION OF PRIOR ART

With the advent of the fishing pole, came the desire to carry it, store it, and protect it. Hence, there have been many prior art designs for fishing rod carriers. None of which, however, allow a person to carry and store fully rigged fishing poles, that is, fishing rods with reels, lines, and terminal tackle still attached thereto, in a ready to fish mode, and can do so without the possibility of line entanglements or snags from hooks. Preferably, a persons' fishing equipment is in a ready to fish mode, whether during portage or storage. One should "arrive" ready to fish, and "leave" ready to fish. Just to use a pole carrier, a person should not have waste time in; (A) assembling and disassembling ones' poles, (B) dealing with frustrating line tangles or snags, or (C) tediously install and remove items of terminal tackle. No prior art pole case or carrier addresses all of these problems.

BACKGROUND-DISCUSSION OF PRIOR ART (contd.)

A fishing pole that is "long and graceful," while used in the sport of fishing, becomes "too long and unwieldy" when not used. To design a pole carrier with these same characteristics only compounds the problem instead of solving it. And normally, "space" is of a premium to a fisherman, whether it be on a bushy bank, a boat, a narrow trail, or in a crowded garage. A preferred carrier is one that is small, compact, and multifunctional in that it can be of additional use to the fisherman, instead of just taking up precious space. Most prior art carriers seem to take up more space, empty or not, then the poles they carry.

By reviewing prior art it also becomes evident that there is no prior art carrier that can accommodate a plurality of poles, simultaneously, that are of virtually any shape or size, that is, "one size fits all." Granted, some prior art carriers could be custom fitted to accommodate each specified set of poles, but this seems prohibitive in terms of time, costs, inventories, and ease of manufacture.

It also becomes evident, by reviewing prior art, that all carriers allow for a fixed number of poles, ranging in number from one to only eight poles. Many times, an eight pole carrier is inadequate for a family or group. Problems also arise because carriers, on occasion, may provide for either too many poles or too few poles, and cannot be changed, their designs are inflexible. For example, to carry eight poles with an eight pole carrier may be fine, but to use this same eight pole carrier to carry only two poles is both excessive and undesirable. Whereas, a carrier whose size and capability can fluctuate in direct relation to the persons' immediate needs, and can do so in seconds, and can carry more than eight poles, would obviously be more efficient and desirable.

U.S. Pat. No. 4726141, McBride et al. Feb. 23, 1988 is for a fishing rod and reel carrier that carries a maximum of two rods with their reels attached thereto. The design is for a flexible material that has two separate pockets into which the two poles, handles and reels only, can be inserted. This design does not allow for the carrying of fully rigged fishing poles since the shafts of the rods, and any line or terminal tackle thereon, would be subject to tangle and snags. And, if lines and terminal tackle were to be used with this carrier, tangles, snags, and perhaps even injury from exposed hooks, could possibly occur. It also should be noted, that unless this carrier is very large in scale, poles that have long rod handles, which are sometimes two feet in length, cannot be accommodated.

BACKGROUND-DISCUSSION OF PRIOR ART (contd.)

U.S. Pat. Nos. 3674190, Wright Jul. 4, 1972 ; 4529112, Miller Jul. 16, 1985; and 4628628, Bergin et at. Dec. 16, 1986, are all patents that effectively utilize a shoulder strap, which, in turn, both enables a person to carry more than one fishing pole at a time, and leaves ones' hands free to carry other equipment. In all three designs, however, variations in the thickness, length, or design, of a particular fishing rod handle, could limit the carriers' capability to carry that particular pole. Also, in all three of the above mentioned designs, all terminal tackle must be removed. And, although the three mentioned designs suggest that the fishing lines can remain on the poles during portage, it should be noted, that in two of the three mentioned designs, Nos. 4529112 and 4628628, exposed and unprotected fishing lines could cause either line entanglements or line breakage to occur. Also, all three carriers appear to be expensive to manufacture, especially in relation to the limited number of poles they might possibly carry.

U.S. Pat. Nos. 3662933, Michal May 16, 1972, and 4523704, Washington Jun. 18, 1985 are primarily for use as car top carriers. They also provide for the carrying of a plurality of fully rigged fishing poles. Both designs, however, are for very large and rigid structures that might be easily carried by a car or truck, but appear too cumbersome and heavy for a person to portage to the waters edge, or from lake to lake, especially if the person also wishes to carry, simultaneously, various other fishing equipment, which is normally the situation. Another problem is that U.S. Pat. No. 4523704 leaves all fishing lines exposed, providing the lines with no protection from trees and brush along a portage, or from high velocity winds created by driving the vehicle. The value of these two mentioned car top carriers, however, are more evident everyday: as cars and trucks seem to be designed smaller and smaller everyday, cargo space becomes more and more limited. A preferred design, however, is a lightweight and compact carrier, for fully rigged fishing poles, that can be attached to any car or truck by means of a simple and inexpensive strap assembly or harness.

Finally, of less relevance, there are other carriers for elongated objects, for example; U.S. Pat. Nos. 4792073, Jacober Dec. 20, 1988 and 4815509, Owen Mar. 28, 1989, are for carrying skis; and 1092833, Grant Apr. 14, 1914 is a carrying bag for polo equipment. Prior art patents for carriers of hunting rifles and shotguns also exist, but they offer no versatility, they normally carry only one gun, and they are characteristically so big and bulky that they must be left behind in the truck or auto rather than taken into the field.

OBJECTS AND ADVANTAGES

Accordingly, it is a primary object of the present invention to provide a multipurpose carrier that can be used for carrying and storing elongated objects, especially a plurality of fully rigged fishing poles. Other elongated objects that can be carried include: rifles, shotguns, muzzle loaders, tripods, and pairs of skis along with their ski poles.

Another primary object of the present invention is to provide a multipurpose, lightweight, and compact carrier that has one or more of the following characteristics. It carries poles in a fully rigged and ready to fish mode; bobbers, sinkers, swivels, hooks, lures, and other items of terminal tackle, can remain on the line. It is capable of transporting, or storing, from one to fifteen fully rigged fishing poles, and can be utilized to carry other equipment at the same time it is carrying poles. Paddles, fishing nets, floatation devices, small tackle boxes and tent poles are just some of the items that can be attached to a preferred carrier. Optional accessory bags, for items such as fishing nets, rain gear, and tackle boxes, can be attached to the preferred carrier very easily.

Another object of the present invention is to provide for the capability that when portaging a canoe or small boat, a preferred carrier can be strapped to the trusses or seats, thereby leaving ones' hands free to carry the canoe or boat. A preferred carrier also enables one to carry all of their fishing poles at one time, over their shoulder, in either the vertical "sling arms," or horizontal "underslung" position, thereby leaving ones' hands free to carry other fishing gear.

Another object of the present invention is to enable a group to use several small carriers rather than using one larger carrier, simply by using additional preferred straps. Yet all of these same small carriers can be carried by one individual, thereby freeing up additional hands to carry other gear. This method is especially useful when, for example, a group is portaging three canoes, and want their poles divided up accordingly. They can utilize three small preferred carriers, one per canoe, yet one person can carry all three preferred carriers across the portage without using any hands; and upon reaching their destination, simply redistribute the carriers, one to each canoe, with all poles fully rigged and ready to fish; and without any line tangles or snags. And should one individual, for some reason, wish to switch canoes with another individual, they need only uncouple their varying quantity of poles from their present carrier, and clip them onto their new carrier.

OBJECTS AND ADVANTAGES (contd.)

Another object of the present invention is to provide a carrier that provides the capability to leave poles behind from a fishing trip, by very quickly and easily disconnecting selected poles from the carrier, without affecting the poles one wishes to take.

Another object of the present invention is to provide a carrier that is economical, in that, a person can "build" a carrier to be only as big, or small, as the person specifically needs. Due to the preferred carriers flexibility, an individual can cream ones' own carrier that fits the individuals' personal needs and wants. For example, someone who has only two poles should not have to buy a more expensive carrier that perhaps carries eight poles. The preferred carrier is therefore more desirable and economical for those who have fewer, or more, items to carry.

Another object of the present invention is to reduce frustrating and time consuming line and hook tangles. Since each and every fully rigged pole has its' own cover, or sleeve, becoming entangled or snagged while portaging through brush and trees is nearly impossible.

Another object of the present invention is to provide a carrier that is; inexpensive, in that, it requires the use of only inexpensive materials; is of simple design to allow for ease of manufacture; is resistant to rust and mildew; and stores easily, in that, the preferred carrier can store ones' poles and guns by simply hanging the carrier on a single nail or hook.

Another primary object of the present invention is to provide a carrier that is unique, in that, a preferred carrier comprises a varying number of various constituent components. The quality of uniqueness exists due to the preferred carriers' flexibility, in that, one is able to vary the number of constituent components in direct relation to the individual consumers' needs and wants. Increased marketability and consumer satisfaction are two of the more obvious advantages attained by providing consumers with an option to satisfy their specific needs. Although most of a preferred carriers' components are multipurpose, their primary purpose, that of composing an effective carrier, requires that the components be both interdependent and complementing. Another unique quality of the preferred carrier is that of using separate multipurpose components, in unison, to reduce line tangles and snags, and provide a safety factor from otherwise exposed hooks and lures.

OBJECTS AND ADVANTAGES (contd.)

Another object of the present invention is to provide a preferred carrier that can be easily attached to the roof of a car or truck. With small cars being common, this solves the problem of having to try to fit long poles into a short cargo area. Also, by segregating a preferred carrier from other potential gear in a cargo area, the possibility of damage to the carrier and its' contents are less likely. In that a preferred carrier is designed to be aerodynamic in shape so that it can be easily portaged through trees and brush, its' shape also provides for very little resistance to the wind velocities encountered while strapped or tied to the roof of a moving vehicle.

Another object of the present invention is to provide a preferred carrier comprising one or more of the following components: (A) A "strap assembly," that is, a conglomeration of various major and minor components that contribute to the overall effectiveness of the carrier. While some form of the major components are mandatory to the scope of the carrier, some of the minor components are to be considered optional; in that, they further enhance and contribute to the scope and characteristics of a preferred carrier, but they may, or may not, be considered mandatory. Components of a preferred "strap assembly," which will be discussed later in more detail, are as follows: (1) A "strap," that is, a long narrow piece of pliant material that provides a carrying means, such as an adjustable shoulder strap or handle. (2) A "connecting means," that is, various connectors that when used in unison, provide the means to link together and unify the various components of the carrier. (3) A "lash," that is, a means of combining and unifying a plurality of components together so as to restrict or contain their individual movement. And (4), an "identification means," that is, a means to identify and differentiate between items such as poles. (B) One or more "sleeves," that is, flexible coverings or wraps that envelop or encase an individual item, such as a fully rigged fishing pole or a gun. Each pole or item that needs to be carded or stored preferably has its' own individual "sleeve," although this is not mandatory, and depends upon the items one wishes to carry or store. And (C), one or more "pouches," that is, flexible coverings or wraps used to envelop or encase items of terminal tackle, or, at alternate times, to envelop or encase the above mentioned "sleeve." Therefore, one "pouch" is necessary for each "sleeve" that is necessary, as determined by above specifications (B).

OBJECTS AND ADVANTAGES (contd.)

A "strap," in a preferred strap assembly, has the characteristics and advantages that follow: (A) The type of strapping to be used should be flexible, lightweight, durable, and wide enough to be comfortable on ones' shoulder. (B) A preferred strap has some form of connector on each of its' two ends, whereby; (1) a strap can be detached without disturbing the remainder of a preferred carrier because the straps' connectors attach to an intermediate set of connectors that the other components also attach to; (2) the connectors should be sturdy, easy to operate with one hand, and provide a large enough entrapment to encircle the strap itself, should one want to form a loop or noose on either or both ends of the strap; and (3) a strap, and its' versatile connectors, can be used similar to a piece of rope for attaching, or tying off, such items as boats, fish stringers, live baskets, or minnow buckets, only without having to tie and untie frustrating knots. (C) The length of a strap can be easily adjusted, through the use of an adjustable sliding buckle, to; (1) aid in tying off items, (2) aid in the balancing of the load while carrying or storing items, and (3), provide for the converting of a strap from a shoulder strap to a carrying handle, which one can accomplish by merely shortening the adjustable strap as much as possible. And (D), optionally provide for a preferred strap to have foot and inch markings on it similar to that of a yardstick or ruler, whereby, it would provide a convenient means of measuring the length or girth of a caught fish.

The "connecting means" in a preferred strap assembly provide for the connecting of one or more individual items to a preferred strap. In that numerous variations of connecting means exist, or are adaptable, it is the object of this invention to provide for a connecting means that include one or more of the following characteristics: (A) Utilizes intermediary connectors, possibly circular in shape, such as rings, in order to influence the items connected to the intermediary connectors to gravitate together naturally, or cluster, into an aerodynamic and compact shape. (B) The connecting means should provide the capability to detach an item selectively from the intermediate connecting means without also having to detach other items, in that, while numerous other connecting means may exist, and may be less expensive, that the advantages of being able to segregate an individual item from a mass of items, very quickly and easily, are highly desirable. And (C), provide that the connecting means are easy to operate, are capable of being placed in an easy to operate position, are inexpensive, are relatively small, are rust proof or rust resistant, and are sturdy yet lightweight. The "connecting means" can be made from metal or from a moldable substance.

OBJECTS AND ADVANTAGES (contd.)

A "lash," in a preferred strap assembly, provides a means for unifying various components, which in turn, helps to eliminate interaction between components and thereby reduces possible damage from vibrations and jolts during portage. A preferred "lash" merely consists of a length of hook and loop type fastener, that is of the back to back style, whereby, it forms a connection or bond, when wrapping about itself. This type of lash is in preference to other obvious types of lashes, such as string or rope, because it is easily adjustable, and there are no knots to tie or untie.

An "identification means" in a preferred strap assembly provides for the identification of, or distinction between poles, that may be achieved by providing for the use of an identification numbering system that provides for three tags bearing the same number to be attached to the three following items; (A) a selected fishing pole or gun, (B) a "pouch" that encases an associated "sleeve," and (C), the back of a drawstring locking mechanism that is on the custom fitted "sleeve" that fits the selected pole or gun. For example, each unit, that is, a pole and its' associated pouch and sleeve, will all bear a similar number that differs from any other unit. Simply match up the numbers to determine which pouch contains the correct sleeve to fit the selected pole. Identification of a specific item also can be accomplished through the use of different colored sleeves, and through recognition of exposed pole handles.

A less expensive embodiment of the preferred carrier provides for the elimination of the connecting means in the preferred strap assembly, whereby a flexible length of strap is permanently attached directly to each "sleeve." A "sleeve" with an attached strap, can still fit within a "pouch," and thereby provides a highly desirable type of carrier, especially when used for carrying only a single elongated item such as a tripod or pair of skis. Also, a person can still carry several "sleeves" very easily merely by gathering together the straps. The biggest advantage in this embodiment of the preferred carrier, however, lies in the fact that once a person easily carries their equipment to their destination, the carrier practically disappears since the carrier is then placed within the "pouch" and then the "pouch" is connected to ones belt, or stuffed into a pocket. Other types of carriers may be great for going to and from, but while at your destination and while using the item carried, there are no provisions for storing the carrier or getting it out of your way. Who wants to carry a large inflexible carrier with them while using their skis for cross country skiing.

OBJECTS AND ADVANTAGES (contd.)

Accordingly, another primary object of the present invention is to provide an easily adjustable "sleeve," or bag, which can effectively encase various types of rod and reel combinations. A preferred sleeve can be adjusted to encase other elongated items as well. Additionally, a preferred sleeve has the following characteristics: (A) For various economic reasons and to accommodate ease of manufacture, several triangular shaped sleeves can be cut from one width of material by inverting every other sleeve pattern while placing the patterns next to each other, laterally, across the width of the material. (B) The sole opening on a preferred sleeve opens or closes through use of a drawstring type closure means and the use of a drawstring locking mechanism, which together provide for an opening that is fully adjustable to the desired degree of openness. This type of closure means not only serves to provide an adjustable opening, but serves to hold in place and restrict the movement of an item that has been only partially inserted into the sleeve. Another advantage of this type of closure means is that it allows for the accommodation of all thicknesses, and all designs, of fishing rod handles. And (C), a preferred sleeve would be made of pliant material that "breathes" so as not to trap moisture that could cause rust or mildew, although, a waterproof or water resistant sleeve also could suffice.

Another advantage of a preferred sleeve is that it encloses and protects a fully rigged pole, except for its' handle, from dust, grime, snags, and line tangles. The handle of a fully rigged fishing pole is all that remains exposed. It is because the preferred sleeve makes no attempt to enclose the handle of a pole, that such a wide variety of poles can be accommodated by a preferred sleeve. As desired, other items can be either fully enclosed or partially enclosed in a preferred sleeve. Another advantage that a preferred sleeve provides is that it can accommodate various types of fishing reels, such as: right or left handed reels, large or small reels, spin cast reels, level wind reels, bait casting reels, spinning reels, fresh water or salt water reels, and fly casting reels. A preferred sleeve, also, can be removed from the pole very quickly and easily; just loosen the sleeves' drawstring, point the tip of the pole downward, and the sleeve will naturally gravitate off of the pole.

OBJECTS AND ADVANTAGES (contd.)

Another object of a preferred sleeve is to provide an adjustable sleeve that easily adjusts in order to compensate for variations in poles of different lengths. A preferred sleeve is one that adjusts merely by tying a knot in its' flexible material while the inverted sleeve is inside out, whereas, the knot separates the needed length of sleeve material from the unneeded, or excess, length of sleeve material. Upon inverting the sleeve back to the right side out condition, the sleeve length is now the correct length and any excess material length, and the knot itself, is within, or inside of, the needed portion of the length of sleeve material. Although various other methods could be used to adjust the length of a sleeve, such as cutting, sewing, or tying off the material with a string, the preferred method of tying a knot in the material is simplistic, effective, less costly, requires no tools, and is semi-permanent in that it can be readjusted to fit a different pole, should the need arise.

Another advantage of a preferred sleeve is that it can accommodate fishing poles of extreme length merely by; (A) breaking down the fully rigged pole into two or more sections, while the reel, line, and terminal tackle remain on the pole, (B) placing the pole sections laterally next to each other, and (C), putting them together into the same sleeve. A pouch can help hold the rod sections together, while it also holds the terminal tackle in place. The use of other items, such as "twist ties," aim can help hold the rod sections together. And although each sleeve could have its' own strap, or could have a connector means whereby it could be attached to another sleeve, a preferred sleeve has connectors that attach to the same intermediate connectors that a preferred straps' connectors also attach to. This feature is unique to prior art carriers and is one of the main reasons that this preferred carrier provides many advantages over prior art.

Additional advantages of a preferred sleeve are: (A) Due to a sleeves' flexible and pliant material, a sleeve can be folded, or stuffed, into a pouch for protection when the sleeve itself is not being used to protect a desired item. (B) By using brightly colored sleeve material, one is less apt to damage their poles by accidentally stepping on them, or perhaps closing a car door or trunk lid on them. (C) Due to their high visibility, and because a sleeves' tip is bigger and softer due to the adjustment knot, eye injuries are less likely to occur. And (D), due to a preferred sleeves' bright color and high visibility, it can be used to display, advertise, or promote an indicia for a manufacturer or individual, through the use of stenciling, patches, silk screening, embroidering, or other means.

OBJECTS AND ADVANTAGES (contd.)

Another object of the present invention is to provide a multipurpose "pouch" that when together in unison with the preferred strap assembly and preferred sleeve, complements a preferred carrier. A pouch is dual-purpose, in that it alternately serves to both encase items of terminal tackle during portage and storage, and serves to encase an empty sleeve that, while fishing, no longer has a fully rigged fishing pole in it. A preferred pouch also helps to protect individuals, especially children, from potential hook related accidents, by encasing the hooks and other items of terminal tackle within its' protective means.

Another object of a preferred pouch is to provide a pouch that attaches to a pole by encompassing about the shaft of the pole. A preferred pouch easily attaches to a pole in the following manner: (A) Place an open pouch, perhaps with a hook or lure within the cavity of the open pouch, next to and underneath the rod, but between the downward hanging reel and the first line guide. (B) Encompass the shaft of the rod by closing the flap of the pouch over and around the shaft. And (C), fasten the flap of the pouch to the face of the pouch with a securing or connecting means.

Another object of a preferred pouch is to provide a pouch that is; (A) large enough to encase one sleeve, whether the sleeve is nearly folded, or stuffed into, the pouch, and (B), is small enough to: place into ones' pocket, clip onto ones' belt, clip onto the intermediary connector of the "preferred strap assembly," or can be conveniently placed out of ones' way.

Another object of a preferred pouch is to provide a pouch that can accommodate nearly any size or type of terminal tackle. Small items, such as small hooks and jigs, should be hooked onto the split ring that is on the inside of the preferred pouch, so that they will not slip out of the pouch. Larger items, such as spinner baits, can be safely enclosed in a pouch by allowing the spinner portion of a bait to protrude from the pouch, but by keeping the hooks on the inside of the pouch. Although the preferred pouch can accommodate nearly all types and sizes of terminal tackle, extremely large lures, such as muskie or some salt water lures, will be better off removed, should any hooks have to protrude from the pouch. The split ring serves to retain small items within a preferred pouch. Other means of retention are also possible, and are under consideration, such as molding a retaining bar into a molded pouch, that would provide the same desired function.

OBJECTS AND ADVANTAGES (contd.)

Another object of a preferred pouch is that while fishing, the pouch, with a sleeve inside, is small and compact. Also, the pouches' small size helps in reducing the size of the enclosed sleeve by retaining the sleeve in a compressed state, while protecting it from dirt and snags. And, although small, a pouch can serve as an excellent bail for a small boat, if, and when needed.

Another object of a preferred pouch is to have the following characteristics. A preferred pouch comprised of a flexible material that resists punctures from fish hooks, is "worm proof," that is, it is impervious to various types of plastic worms, is inexpensive, is rust resistant, and provides for ease of manufacture.

These together with other objects, features, options and advantages that will become subsequently apparent reside in the details of construction and operation as more fully hereinafter described and claimed, and by reference to the accompanying drawings forming a part hereof, wherein like numerals refer to like parts throughout.

DRAWING FIGURES

FIG. 2 shows a perspective view of a fully constructed and assembled sleeve.

FIG. 3 shows a cross section view of a portion of the sleeves' hem and drawstring, indicated by the section lines 3—3 in FIG. 2.

FIG. 4 shows a top elevational view of a sheet of pouch material used in the present invention with the fold line and stitching lines indicated, and with two small holes punched.

FIG. 5 shows a perspective view of a fully constructed and assembled pouch with a sleeve folded up and placed into the pouch cavity.

FIG. 6 shows a perspective view of a fully constructed and assembled pouch with an item of terminal tackle, or in this instance, a fishing lure, placed into the pouch cavity.

FIG. 7 shows a perspective view of an additional embodiment, a pouch that is molded and also uses a different type of fastener than does the preferred pouch illustrated in FIG. 5 and FIG. 6.

FIG. 8 shows a perspective view of a fully rigged fishing pole having been partially inserted into a sleeve after the item of terminal tackle has been encased in the attached pouch.

FIG. 9 shows a perspective view of several components of the strap assembly.

FIG. 10 shows a perspective view of a fully rigged fishing pole fully inserted into its' sleeve, after the poles' item of terminal tackle has been encased in the attached pouch.

FIG. 11 shows a perspective view of the strap assembly with three fully protected and fully rigged fishing poles attached thereto.

FIG. 12 shows a perspective view of a belt and buckle closure on a sleeve that has been adjusted in length by tying a knot in the material then, after the desired line spacing, next add "FIG. 13 shows a sectional view of FIG. 12 sleeve that has been adjusted in length by tying a string around the sleeve material."

DESCRIPTION OF INVENTION

Figure 1:
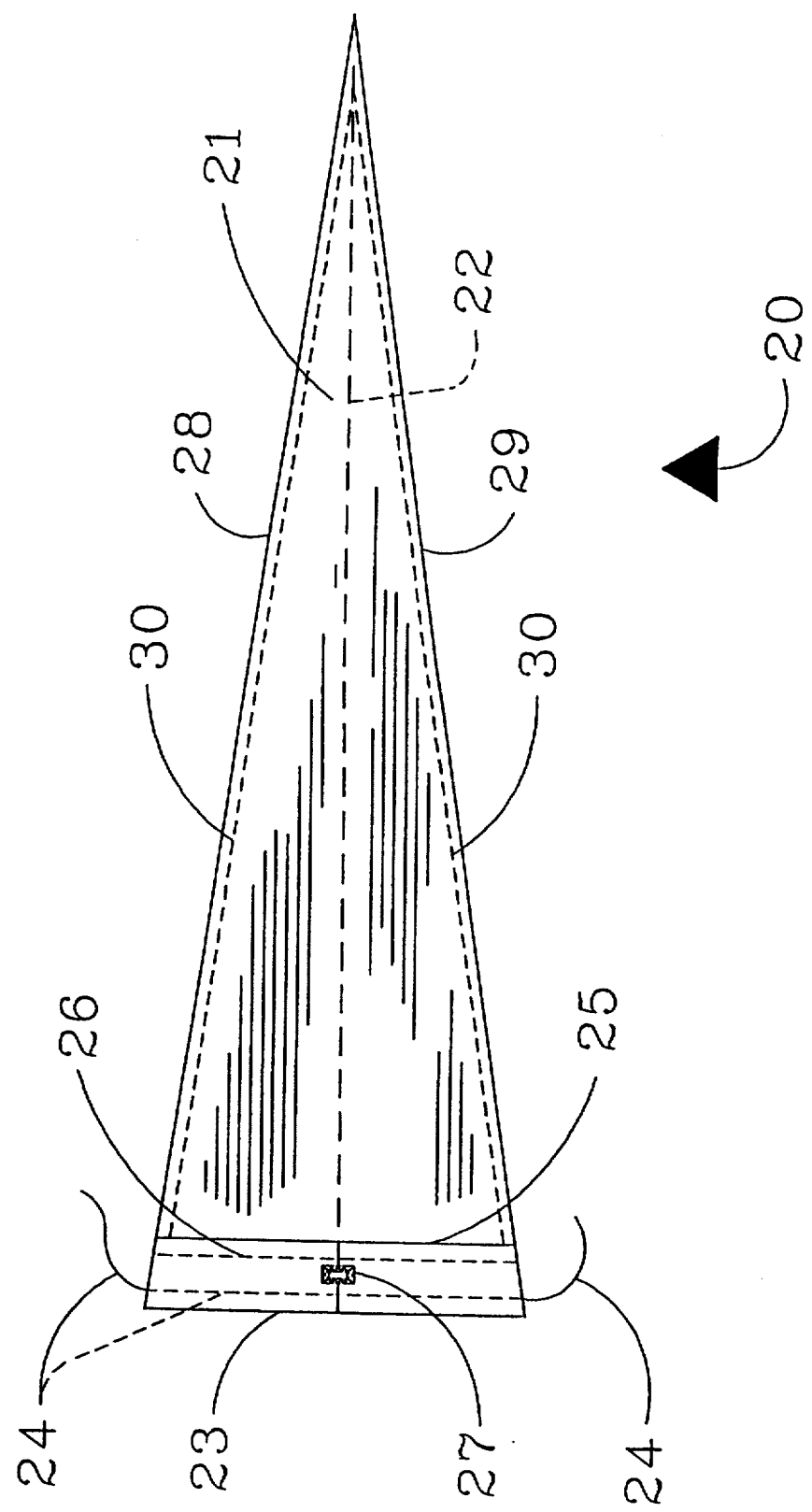
FIG. 1 shows a top elevational view of a sheet of sleeve material used in the present invention with the hem, drawstring and buttonhole installed, and with the fold line and stitching lines indicated.

A typical embodiment of a fully constructed universal carrier of the present invention is best illustrated by first breaking the carrier down into three major components: A "sleeve" 20, FIG. 1, 2, 8, 10, 11, 12 & 13. A "pouch" 40, FIG. 4, 5, 6, 8, 10 & 12. And a "strap assembly" 70, FIG. 9 & 11. Although each of the three mentioned components have great merit individually, the full effectiveness and uniqueness of a preferred carrier is dependent upon, and is integrated, through unification of the individual components with the items to be carried or stored.

The first of the three major components, "sleeve" 20, is constructed with a sheet of pliable material 21, as illustrated in FIG. 1. Pliable material 21 can be formed from nearly any type of flexible or pliable materials, such as leathers, vinyls, rubbers, plastics, woven cloths, or any variation, or any combination thereof. Pliable material 21 may be waterproof if so desired, although consideration should be given for the potential trapping of damaging moisture. The dimensions of the sheet of material 21 can depend upon the dimensions of the elongated item to be carded or stored. FIG. 1 shows a top elevational view of a triangular shaped sheet of woven nylon, pliable material 21 used in the present invention. The triangular shape of material 21 was selected for preferred sleeve 20 because it conforms with numerous elongated items, especially fishing poles and guns, and because of ease of manufacture and costs. In general, preferred sleeve 20 is simply an elongated pliable bag which has a drawstring closure means for its' open end, and provisions for the bag to be carried, or hung, by a carrying means such as a strap. Each sleeve 20 could have its' own strap (61) FIGS. 12, or, as in the preferred method, one or more sleeves 20 can attach to a single common strap. FIG. 1 shows preferred material 21 with a hemline 23, a drawstring 24, and a buttonhole stitch 27 already installed. The hem is formed by folding and stitching 26 the shorter of the three edges of the elongated triangle, edge 25, towards the vertex formed by first elongated edge 28 and second elongated edge 29, thereby creating hemline 23. The manner in which the hem is actually constructed can vary as long as the hem is sturdy, and provides an opening, or passage, through which drawstring 24 can pass. Preferred sleeve 20 uses buttonhole stitch 27 placed on or near the intersection of fold line 22 and hem stitching 26, thereby providing an opening, or hole, in pliant material 21 through which a preferred connecting means can be attached. By next folding hemmed material 21 along fold line 22, whereby first elongated edge 28 overlays second elongated edge 29, and then by seaming edges 28 and 29 together along stitch line 30 by stitching, the final shape of preferred sleeve 20 is formed. Although preferred sleeve 20 uses a strong suitable thread for stitching various surfaces together, other methods could be used.

DESCRIPTION OF INVENTION (contd.)

FIG. 2 is a perspective view of a fully constructed and assembled preferred sleeve 20. By placing a suitable drawstring locking device 31 on drawstring 24, the open end of sleeve 20 becomes adjustable, and sleeves' 20 degree of openness can be controlled very easily. Preferred sleeve 20 uses a common drawstring locking device 31 which both eliminates any possible drawstring 24 slippage, and provides for convenient placement of one, of three, identification numbers 35 used. Identification numbers can be placed on tags, labels, or other indicia. Although the use of a numbering system for identification purposes is not essential to the overall operation of the preferred carrier, the numbering system eliminates a great deal of confusion by distinguishing one sleeve 20 of specific length, from other sleeves 20 of possibly different specific lengths. There exists various means for providing identification to an object, the preferred carrier simply uses numbers which are preprinted on gummed labels. Preferred sleeve 20 provides two positions for facilitating the connecting means whereby one or more sleeves 20 can be connected to one common carrying means such as a strap. By connecting a clasp 32A to preferred sleeve 20 through use of the opening provided by buttonhole stitching 27, the first of two desired connection positions, for attaching the carrying means, is established. The second connection position is established along fold line 22, FIG. 1, and is in line with, but spaced away from buttonhole stitching 27 approximately one third of the total length of preferred sleeve 20. The distance between the two connection positions should be constant for all sleeves that are produced to carry like items, thereby enabling a single carrying means to be simultaneously attached to a plurality of sleeves. The proper amount of spacing, or distance between the two connection positions, aides in the proper balancing of, or weight distribution of, the preferred carrier when in use. The second connection position is created by connecting a second clasp 32B to a clasp connector strap 33 that is attached to preferred sleeve 20 by clasp connector strap stitching 34. Preferred clasp connector strap 33 consists of a length of common web strapping material.

FIG. 3 is a cross sectional view of a selected portion of sleeve 20, as indicated by section lines 3—3 in FIG. 2, and further illustrates stitched 26 hem with drawstring 24 having been inserted within the confines of the hem. Drawstring 24 is a cut length of string or cord which is used to open and close, to varying degrees, the hem of preferred sleeve 20. The concept of closing preferred sleeve 20 by gathering the opening, could also be achieved through other compatible methods, such as using a FIG. 12, belt and buckle (63) type of closure means.

DESCRIPTION OF INVENTION (contd.)

The second of the three major components, "pouch" 40, is constructed with a sheet of pliable material 41 as illustrated in FIG. 4, 5 and 6, or, as an additional embodiment, can be a molded pouch 50, as illustrated in FIG. 7, by using a moldable substance 53. In general, preferred "pouch" 40 or 50 is a receptacle or purse that; (1) has a flap that can be fastened in a closed position; (2) has dimensions that are large enough for the cavity of pouch 40 or 50 to contain at alternate times either "sleeve" 20, or various types and sizes of terminal fishing tackle 49, FIG. 7, such as a fishing lure; and (3), has a connector clip 60 whereby the pouch 40 or 50 can be attached to an object.

FIG. 4 shows a top elevational view of a sheet of vulcanized synthetic rubber, a pliable material 41 used in the present invention. Preferred pouch 40 is constructed by; (1) punching two holes 44, 45 through material 41 for the later insertion of a split ring 46, FIG. 5, (2) folding pliable material 41 at illustrated fold line 43, and (3), seaming both edges of overlapped material 41 by stitching along indicated stitch lines 42A and 42B. The cavity, or pocket, that is created by performing the above steps then becomes more accessible by next inverting, or turning inside out, the pocket itself. By turning pouch 40 inside out, not only does the cavity seemingly become larger, pouch 40 takes on a finished look, FIG. 5, in that, the two seams are now hidden within the pouch.

FIG. 5 shows preferred pouch 40 along with preferred sleeve 20 that has been folded up and placed within the cavity confines of pouch 40. FIG. 5 also shows split ring 46 being used as a retainer ring by attaching split ring 46 to preferred pouch 40 through use of the two punched holes. A clip 60 is connected to split ring 46. The flap of preferred pouch 40 can be held in the closed position through use of a loop 47A and hook 47B, two part closure means. Each of the two pieces of the two part fastening system 47A, 47B is attached to preferred pouch 40 through use of an adhesive. Stitching, stapling, or riveting, are some of the other methods commonly used to attach this type of fastener. The loop portion of fastener 47A is attached to the inside face of the flap of pouch 40 and the hook portion of fastener 47B is attached to the front face of pouch 40 whereby when the flap of the pouch is closed, loop fastener 47A engages hook fastener 47B thereby securing pouch 40 in the closed position. Although numerous other types of fasteners are suitable, the common loop and hook type of fastening system was deemed suitable for preferred pouch 40 due to ease of application and adjustability. FIG. 6 shows the same preferred pouch 40 as shown in FIG. 5, but pouch 40 now contains an item of terminal fishing tackle 49 attached to fishing line 48, rather than containing preferred sleeve 20.

DESCRIPTION OF INVENTION (contd.)

An additional embodiment of a preferred pouch 50 is shown in FIG. 7. A moldable substance 53 used to mold preferred pouch 50 should be durable, puncture resistant, and fade resistant. It should also be worm proof, that is, moldable substance 53 should be resistant to the harmful effects of certain types of fishing tackle, such as certain compositions of plastic worms, that could cause damage to preferred pouch 50. The type of closure means that is used to secure the flap of preferred pouch 50 in a closed position can take various forms. FIG. 7 shows a combination of holes 51 and posts 52 which could be used in a hole and post type of closure means. This type of adjustable fastening system is commonly used not only to fasten, but to make the size of a common baseball cap adjustable. The type of fastening system molded for use on preferred pouch 50 could also be one of any of various suitable types, such as the belt and buckle type, or belt and cam buckle type of closure means. Preferably, the type of fastening system used will allow for the flap to be closed to varying degrees, therefore allowing pouch 50 to be attached to varying thicknesses of fishing poles. Additionally, preferred pouch 50 could have a retaining bar, or perhaps two retaining bars, one on each side of the cavity of pouch 50, that are molded into pouch 50 in order to provide the same function as does split ring 46 in FIG. 6. Another enhancement to either of two preferred pouches 40 or 50, which has been proven to be very useful, is the addition of clip 60, a connecting means attached to the outside of pouch 40 or 50. A connecting means such as clip 60 provides a convenient means of connecting pouch 40 or 50 to another item, such as ones' belt loop or perhaps connector ring 74A or 74B FIG. 9, while one is in the act of fishing and pouch 40 or 50 is being used to cover and protect its' corresponding sleeve 20. Provisions for the attachment of a clip 60 can be easily provided for in the various possible designs of molded pouch 50 simply by providing an attachment hole in the molded substance.

FIG. 9 shows a perspective view of several components of a preferred "strap assembly" 70. A strapping material 71 used in preferred strap assembly 70 is a common nylon web strapping that has been made to be adjustable in length through the use of an adjusting buckle 72. By fitting trigger type swivel connectors 73A and 73B to adjusted strap material 71, swivel connectors 73A and 73B can then be easily connected, when desired, to connector tings 74A and 74B. Connector tings 74A and 74B provide a means of connection for attaching one or more preferred sleeves 20 to strap assembly 70. The use of connector tings 74A and 74B in preferred strap assembly 70 provides for a plurality of sleeves 20 to be connected or disconnected very easily, while at the same time, causes sleeves 20 to cluster together into a compact and portable unit whereby only a singular strap is needed. Other types of connecting means are envisioned, and are contemplated, that will work equally well for this application. They are molded in a quick release style of design, are rust proof, and follow the same concept of strap assembly 70 that is illustrated in FIG. 9. The fact that certain types of various connectors are illustrated as being used throughout the present invention, does not limit nor restrict, the scope of the invention. It is anticipated that if this invention is mass produced, all connecting means will eventually be made of a sturdy molded substance and be of an enhanced design whereby both material and production costs will be lessened.

While my above description contains many specificities, these should not be construed as limitations on the scope of the invention, but rather as an exemplification of one preferred embodiment thereof. Many other variations are possible, only a few of which are mentioned in the above paragraphs. Accordingly, the scope of the invention should be determined not by the embodiment(s) illustrated, but by the appended claims and their legal equivalents.

OPERATION OF INVENTION

FIG. 8 shows a perspective view of a fully rigged fishing pole 59 having been partially inserted into sleeve 20 after an item of terminal tackle 49 has been encased in preferred pouch 40. Preferred pouch 40 is shown having already been attached to fishing pole 59 by encompassing the shaft of a fishing rod 54 with the flap of pouch 40, and then securing the flap of pouch 40 by connecting the two part fastening system. Preferred sleeve 20 is shown as it would appear after its' length has been adjusted 58 to fit a selected fully rigged fishing pole 59. Preferred sleeves' 20 length, FIG. 12 & 13, is adjusted to fit the corresponding length of fully rigged fishing pole 59 merely by tying a knot (64) in the material, or, by tying a string (65) around the material, at the beginning of the excess length of sleeve material 58 while sleeve 20 is in the inverted or inside out position. Once the adjusting knot (64) has been tied in sleeve 20, sleeve 20 is then reverted to the right side out position whereby the excess of sleeve material 58 is contained within the confines of sleeve 20 itself. FIG. 8 illustrates an example of fully rigged fishing pole 59 as being composed of a fishing rod 54, a fishing reel 55, fishing line 48, and an item of terminal fishing tackle 49. Additionally, FIG. 8 illustrates how an identification system can be utilized to differentiate the combinations of matched sets of components from one another. Once preferred sleeve 20 is adjusted to fit selected fully rigged fishing pole 59, a first of three identical identification numbers 35 is attached to drawstring locking device 31 on preferred sleeve 20, a second identical identification number 56 is attached to fully rigged fishing pole 59, and a third identical identification number 57 is attached to preferred pouch 40. A differently numbered set of three identical identification numbers would be used to identify an additional matched set of sleeve 20, pole 59, and pouch 40. Since several sleeves could be made of the same color of pliable material 21, but yet each of the sleeves 20 has been adjusted 58 to fit a different length of fishing pole 59, the use of an identification system has proven to be very effective in the elimination of confusion and frustration.

FIG. 10 shows a perspective view of fully rigged fishing pole 59 after its' item of terminal fishing tackle has been placed into preferred pouch 40, and after fully rigged fishing pole 59 has been fully inserted into its' adjusted sleeve 20. The opening of preferred sleeve 20 is shown as it would appear after it has been drawn closed about the handle of fully rigged fishing pole 59 through use of drawstring 24. The opening of preferred sleeve 20 is securely held in the closed position through use of drawstring locking device 31. Most of the weight of fully rigged fishing pole 59 is thereby borne by drawstring 24 and drawstring locking device 31. And since clasp 32A is connected to, by encompassing, the load bearing drawstring 24, clasp 32A is provided with a sturdy connection point, and sleeves' 20 pliable material 21 is not required to bear the brunt of the weight of fully rigged fishing pole 59.

FIG. 11 shows a perspective view of the preferred carrier as it would appear if it were being used to carry or store three fully rigged fishing poles. Each of three protective sleeves 20 with their protective pouches hidden within, are shown protecting three fully rigged fishing poles which are each individually connected to preferred strap assembly 70. Three protective sleeves 20 and their contents are shown bound together with a lash 77. Preferred lash 77 is merely two lengths of hook and loop type fastener which have been attached to each other in a back to back style. This back to back style of hook and loop fastener is commonplace and is preferred to using rope or twine since one does not have to then tie or untie knots to bind sleeves 20 together. This type of adjustable fastener binds sleeves 20 together simply by wrapping lash 77 around sleeves 20 and then overlapping itself.

If so desired, the preferred carrier, as illustrated in FIG. 11, can be conveniently tied onto, or strapped to the roof of ones' car or truck. This capability has proven to be very attractive to people who own small cars and have limited cargo space.

I claim:

1. An apparatus for carrying an elongated item, the apparatus comprising: an elongated bag made of a pliable material and a separate and distinct receptacle of sufficient size to accommodate the elongated bag; wherein the elongated bag is of sufficient size to accommodate simultaneously the elongated item and the receptacle; and further comprises:

(a) means for closing the bag, and
(b) means for adjusting the length of the elongated bag to fit the elongated item; and the receptacle further comprising:
(c) means for closing the receptacle.

2. The apparatus of claim 1 further comprising means for carrying the elongated bag.

3. The apparatus of claim 2 wherein the receptacle further comprises a means for connecting the receptacle to the elongated item.

4. The apparatus of claim 3 wherein the means for carrying is a strap permanently attached to the elongated bag.

5. The apparatus of claim 3 wherein the elongated bag further comprises means for attaching the elongated bag to the means for carrying, and the means for carrying further comprises intermediate connecting means for interconnecting (a) a plurality of elongated bags containing elongated items, (b) a plurality of elongated bags containing elongated items and receptacles, (c) at least one empty receptacle, and (d) at least one receptacle containing one elongated bag within.

6. The apparatus of claim 5 wherein the receptacle further comprises means for attaching the receptacle to another item.

7. The apparatus of claim 5 in which the means for closing the bag is a drawstring having a locking mechanism.

8. The apparatus of claim 5 in which the means for closing the bag is a belt and buckle mechanism.

9. The apparatus of claim 5 wherein the means for attaching the bag to the carrying means is a clasp attached to the bag.

10. The apparatus of claim 9 in which the means for carrying further comprises a strap secured to the elongated bag, wherein at least one end of the strap is secured to the bag through a trigger type swivel connector.

11. The apparatus of claim 10 wherein the strap passes through the swivel connector and back to a sliding adjustment buckle, the connector and the buckle forming an arrangement allowing lengthwise adjustment of the strap.

12. The apparatus of claim 11 wherein the intermediate connecting means comprises a ring located intermediate between the swivel connector and the clasp.

13. The apparatus of claim 12 wherein the means for connecting the receptacle to the elongated item includes a flap capable of wrapping around the elongated item, closing, and locking in the closed position.

14. The apparatus of claim 13 wherein the receptacle is of sufficient size to accommodate a terminal fishing tackle selected from a group consisting of hooks, sinkers, bobbers, swivels, artificial lures, and artificial baits.

15. The apparatus of claim 14 further comprising means for identifying and associating the elongated bag, the receptacle and the elongated item wherein the means for identifying and associating is selected from a group consisting of tags, labels, and indicia.

16. The apparatus of claim 15 wherein the receptacle is made of a moldable substance.

17. The apparatus of claim 16 wherein the means for closing the receptacle includes a hole and post closure and the means for attaching the receptacle to another item comprises a clip attached to the receptacle.

18. The apparatus of claim 15 wherein the receptacle is made of a pliable material.

19. The apparatus of claim 18 wherein the means for closing the receptacle include a loop and hook closure and the means for attaching the receptacle to another item comprises a clip connected to a split ring inserted through a hole in the receptacle.

20. The apparatus of claim 5 wherein the means for adjusting the length of the elongated bag is selected from a group consisting of a knot tied in the elongated bag and a string tied around the elongated bag.

* * * * *

UNITED STATES PATENT AND TRADEMARK OFFICE
CERTIFICATE OF CORRECTION

PATENT NO. : 5,417,354  
DATED : May 23, 1995  
INVENTOR(S) : James C. Jones

It is certified that error appears in the above-indentified patent and that said Letters Patent is hereby corrected as shown below:

On title page, item [76] Inventors address, change "7" to --8087--.

Col. 3, line 66, change "cream" to -create-.

Col. 5, line 4, change "covetings" to -coverings-.

Col. 5, line 7, change "carded" to -carried-.

Col. 5, lines 10-11, change "covetings" to -coverings-.

Col. 6, line 54, change "." to -?-.

Col. 7, line 24, change "either .fully" to -either fully-.

Col. 7, line 61, change "aim" to -also-.

Col. 8, line 46, change "nearly" to -neatly-.

Col. 9, line 65, change "material" to -material.-.

Col. 9, lines 65-66, delete -then, after the desired line spacing, next add "-.

Col. 9, line 68, delete -"-.

Col. 10, line 24, change "carded" to -carried-.

UNITED STATES PATENT AND TRADEMARK OFFICE
CERTIFICATE OF CORRECTION

PATENT NO. : 5,417,354

DATED : May 23, 1995

INVENTOR(S) : James C. Jones

It is certified that error appears in the above-indentified patent and that said Letters Patent is hereby corrected as shown below:

Col. 10, line 35, change "Figs" to -Fig-.

Col. 11, line 45, after 'belt' and before 'and' insert -(62)-.

Col. 13, line 17, change "tings" to -rings-.

Col. 13, line 17, change "tings" to -rings- (2nd occurance on same line).

Col. 13, line 20, change "tings" to -rings-.

Signed and Sealed this

Seventeenth Day of October, 1995

BRUCE LEHMAN

*Attest:*

*Attesting Officer*        Commissioner of Patents and Trademarks